United States Patent [19]

Baumbach et al.

[11] Patent Number: 4,773,083
[45] Date of Patent: Sep. 20, 1988

[54] QPSK DEMODULATOR

[75] Inventors: Randall L. Baumbach, Arnold, Md.; Robert G. Curtis, Sudbury; Richard G. Berard, Chelmsford, both of Mass.

[73] Assignee: Raytheon Company, Lexington, Mass.

[21] Appl. No.: 796,342

[22] Filed: Nov. 8, 1985

[51] Int. Cl.[4] .............................................. H04B 7/10
[52] U.S. Cl. .................... 375/100; 328/166; 375/10
[58] Field of Search ............... 370/20, 85; 375/10, 375/11, 12, 13, 14, 15, 99, 100, 101, 102; 328/165, 166

[56] References Cited

U.S. PATENT DOCUMENTS

| | | | |
|---|---|---|---|
| 3,518,680 | 6/1970 | McAuliffe | 375/120 |
| 3,818,347 | 6/1974 | Holsinger | 375/120 |
| 3,906,347 | 9/1975 | Motley et al. | 375/39 |
| 3,962,637 | 6/1976 | Motley et al. | 375/14 |
| 3,978,407 | 8/1976 | Forney, Jr. et al. | 375/15 |
| 4,004,226 | 1/1977 | Qureshi et al. | 375/101 |
| 4,034,340 | 7/1977 | Sant'Agostino | 375/10 |
| 4,083,009 | 4/1978 | Bickford et al. | 375/100 |
| 4,262,360 | 4/1981 | Bigo et al. | 375/15 |
| 4,320,517 | 3/1982 | Godard et al. | 375/14 |
| 4,356,562 | 10/1982 | Wright | 370/100 |
| 4,376,309 | 3/1983 | Fenderson et al. | 375/101 |
| 4,416,017 | 11/1983 | Jasper et al. | 375/99 |
| 4,449,223 | 5/1984 | Liskov et al. | 375/10 |
| 4,501,002 | 2/1985 | Auchterlonie | 375/86 |

*Primary Examiner*—Robert L. Griffin
*Assistant Examiner*—Stephen Chin
*Attorney, Agent, or Firm*—Philip J. McFarland; Richard M. Sharkansky

[57] ABSTRACT

A receiver including two optimizers for demodulation, sampling and quantization of received QPSK digital data. One optimizer adjusts the phase of a reference signal used for demodulating the QPSK data into baseband in-phase and quadrature channels and another optimizer adjusts a sampling clock used to sample and quantize the baseband channels. The reference signal and the sampling clock are dithered in quadrature. Variations in the amplitude of the quantized data extracted by an eye quality monitor. Each optimizer multiplies the eye quality monitor output by a corresponding dither clock and integrates to form an error signal. Phase shifters, responsive to corresponding error signals and dithered clocks, adjust the phase of the demodulation reference signal and sampling clock. The data quality signal monitor translates the magnitude of the quantized data signals to a common set of signals for each state of the data signal. These common signals are translated into a voltage representing the degree to which the data signal amplitude corresponds to a predetermined value. Additionally, a phase shifter is shown which splits its input signal into two signals in quadrature. Theses two signals, when multiplied by two corresponding values and the products summed, form a phase shifted version of the input signal. The two values correspond to a nominal phase shift and vary to impart a linear phase change to the input signal proportional to a control voltage.

11 Claims, 6 Drawing Sheets

QPSK DEMODULATOR

The United States Government has rights in this invention pursuant to Contract No. DAAB07-78-C-0034 awarded by the United States Army.

BACKGROUND OF THE INVENTION

The present invention relates generally to digital communications receivers, and more particularly, to digital communication receivers having means to correct the phase of a demodulation reference signal and a sampling clock for optimal operation of the receiver.

In a typical satellite communication system, one method of accessing communication channels on a satellite is by time allocation of the channels among users of the system, referred to as time division multiple access (TDMA). Users of the system receive transmitted data from the satellite in a burst mode, i.e., data for the users is contained in a serial bit stream of variable length from the satellite. This bit stream 15 includes a preamble to allow synchronization of the user's receivers to the serial bit stream. Synchronization involves generating a demodulation reference signal of proper phase for demodulation of a phase shift keying (PSK) or a quadrature phase shift keying (QPSK) data (coherent or differential demodulation) from the satellite and generating a sampling clock of proper phase for optimum sampling of the demodulated data. In typical burst mode satellite communication systems, this synchronization is effected during the preamble and for the remainder of the burst the demodulation reference signal and/or the sampling clock are independent of the received data bit stream. Any drift in phase by the demodulation reference signal or the sampling clock during demodulation of the data portion of the serial bit stream causes performance (error rate) degradation of the receiver. This drift in phase is mainly caused by thermal changes and aging of components in the receiver. To obviate these effects, it is common practice to pre-age critical components responsible for generating the demodulation reference signal and the sampling clock (e.g., oscillators, filters) and operate them in thermally stabilized ovens. These practices reduce, but do not eliminate, drift. Pre-aging, while slowing down drift due to aging, is time consuming and expensive. The ovens, on the other hand, require large amounts of power, are bulky and expensive. Further, the requisite power sources needed to operate the ovens are bulky and heavy.

Therefore, it is a primary object of this invention to provide an apparatus which automatically compensates and corrects for drift in phase of the demodulation reference signal and the sampling clock without pre-aging the critical components or operating the critical components in an oven.

An additional object of this invention is to provide an apparatus which automatically adjusts the phase of the demodulation reference signal and the sampling clock to optimize performance of the demodulator.

To implement the above objectives, an indicator is required to indicate the quality of the demodulated data. To do this, it is a further objective of this invention to provide an eye quality monitor for determining the quality of the demodulated QPSK data.

Additionally, a phase shifter is required to phase shift the demodulation reference signal. To do this, it is a further object of this invention to provide a phase shifter which shifts the phas of the demodulation reference signal in response to a control signal.

SUMMARY OF THE INVENTION

These objects and other objects of this invention are obtained generally by superimposing small variations (dither) on both the demodulation reference signal and the sampling clock in quadrature, detecting amplitude variations in the demodulated data in response to the dither on the demodulation reference signal and the sampling clock, and adjusting the phase of the demodulation reference signal and the sampling clock to minimize the amplitude variations in the demodulated data.

Additionally, the eye quality monitor encodes the demodulated data into a common code representing the degree of correlation between the amplitude of the demodulated data and a predetermined amplitude for all states of the demodulated data, and includes a digital-to-analog converter for converting that common code into a voltage. The predetermined amplitude is the optimal amplitude for the demodulated data.

Further, a phase shifter splits the demodulation reference into two signals in quadrature. The two signals are multiplied by two corresponding values and the products summed to form a phase shifted version of the demodulation reference signal. The two corresponding values are interrelated so that they have a nominal value (corresponding to a nominal phase shift) and vary in opposition to one another in response to a control signal.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENT

Figure 1:
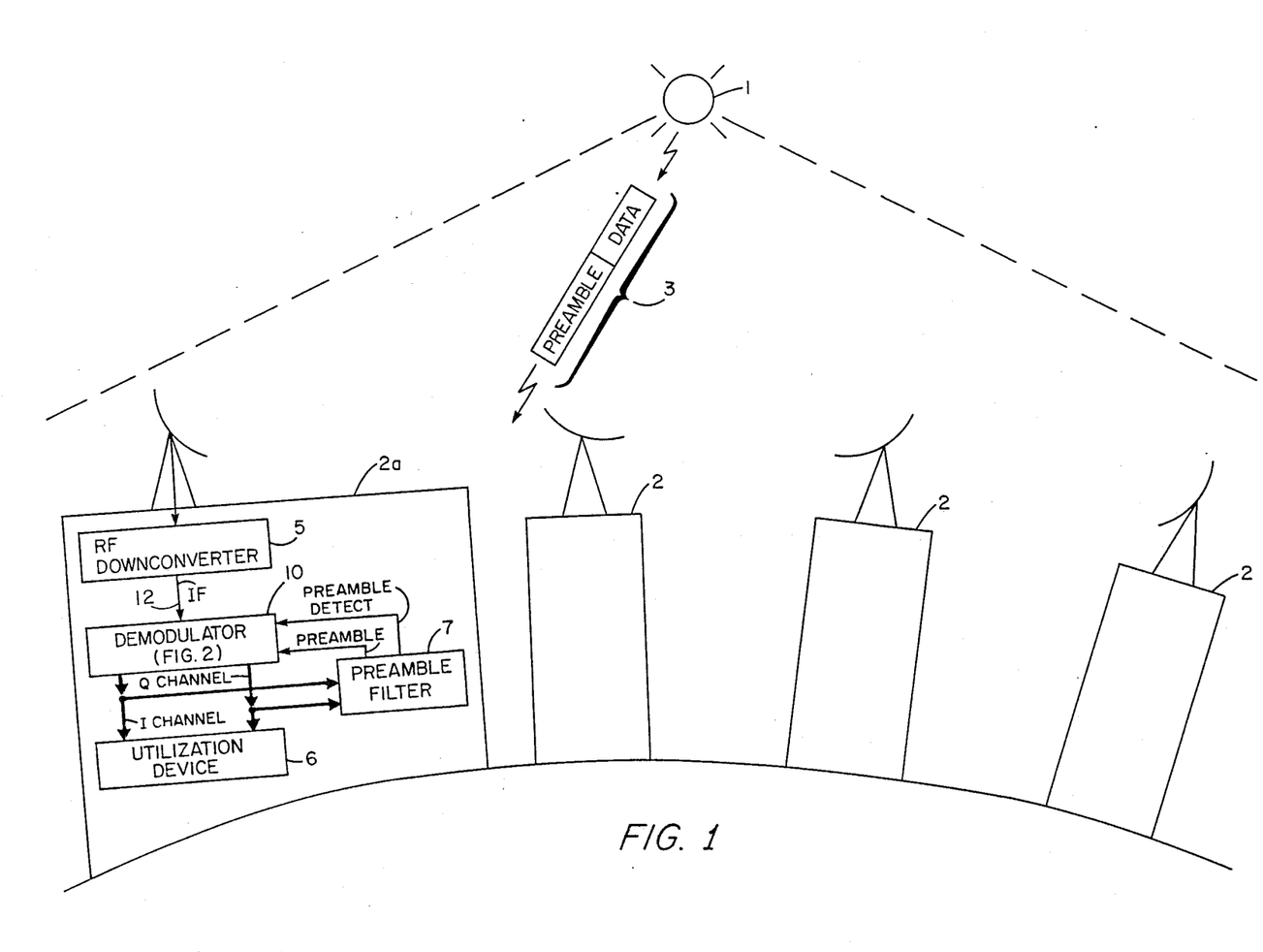
FIG. 1 diagrams a typical TDMA satellite communication system embodying this invention.

Referring to FIG. 1, a typical TDMA satellite communication system is shown. A satellite 1 orbits the earth (not numbered) transmitting a radio frequency (RF) signal modulated in QPSK by a serial bit stream 3, hereinafter referred to as QPSK data signal. The serial bit stream 3 has data preceded by a preamble. By preamble, we mean a synchronization burst common to all receivers of the serial bit stream 3. The RF signal is received by a plurality of widely spaced receivers 2. An exemplary one of the receivers, receiver 2a, shows the major components in each receiver 2. RF down converter 5 translates the received RF signal to an intermediate frequency (IF) signal. Demodulator 10 demodulates the IF signal to baseband, providing an in-phase (I) data channel and quadrature (Q) data channel from the QPSK data signal to utilization device 6. A preamble filter 7, responsive to the I and Q data channels, detects reception of the preamble in the serial bit stream 3, generates a preamble detect signal and passes the preamble after filtering. The demodulator 10, in response to the preamble detect signal, synchronizes an internal sampling clock (not shown) to the preamble from the preamble filter 7.

Figure 2:
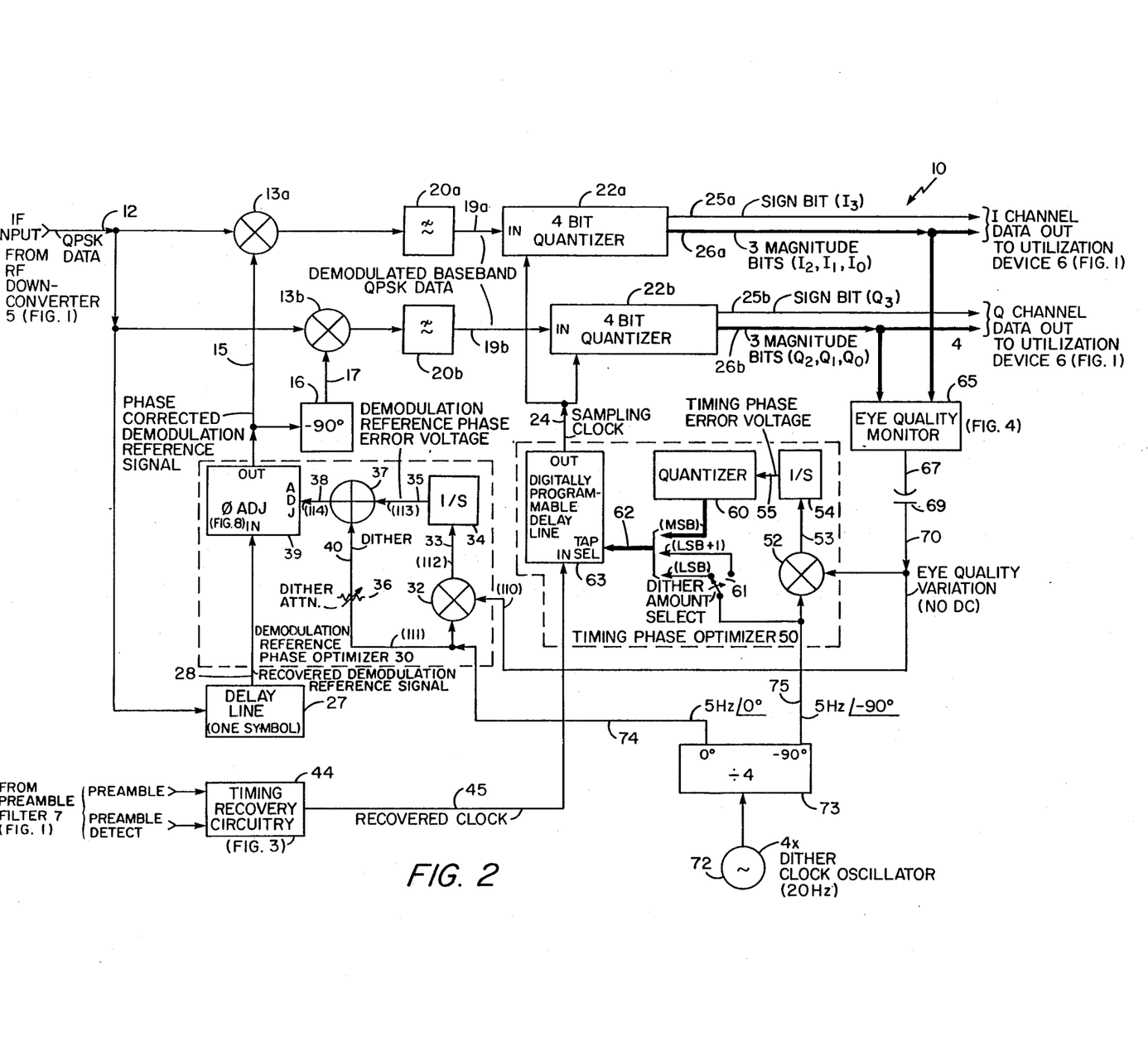
FIG. 2 is a block diagram of the demodulator optimizer.
Figure 3:
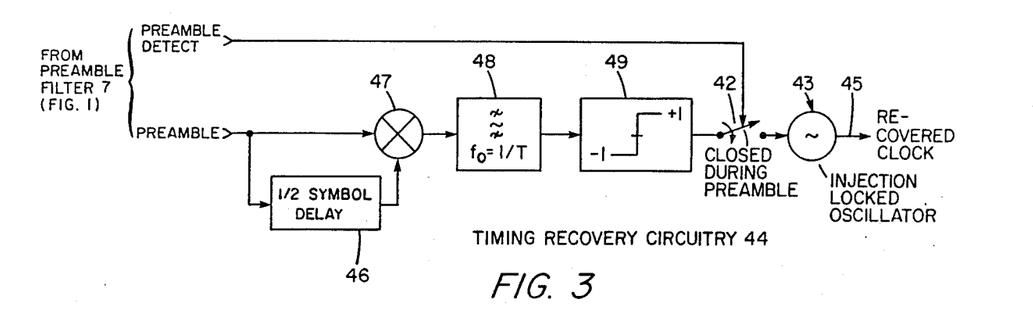
FIG. 3 is a block diagram of the timing recovery circuitry in FIG. 2.

Referring to FIG. 2, the demodulator 10 is diagrammed having circuitry to maintain optimum demodulation, sampling and quantization of the QPSK data signals. QPSK data signals modulated at an intermediate frequency (typically at VHF or UHF) are coupled to demodulator 10 by lead 12. A demodulation reference signal, which has the same phase and frequency as a previously received data symbol of the QPSK data signal, is fed to demodulator 13a to differentially demodulate the in-phase channel (I) of the QPSK data signal. The same in-phase demodulation reference signal on lead 15 is phase shifted by phase shifter 16 to produce a demodulator reference signal delayed by 90° on lead 17 for coupling to demodulator 13b to differentially demodulate the quadrature (Q) channel of the QPSK data signal. In-phase and quadrature components of the demodulated QPSK data signal from demodulators 13a, 13b pass to low pass filters 20a, 20b for passing baseband data signals from the differential demodulation process. In-phase and quadrature demodulated baseband data on leads 19a, 19b from low pass filters 20a, 20b, are fed to quantizers 22a and 22b for sampling and quantizing the in-phase and quadrature component of the demodulated baseband data, respectively, when commanded to do so by a sampling clock on lead 24. The quantizers 22a, 22b produce three bits (buses 26a, 26b) plus a sign bit (leads 25a, 25b) representing the magnitude and polarity, respectively, of the in-phase and quadrature demodulated baseband data presented to said quantizers 22a, 22b. The demodulation reference signal is derived from the QPSK data signal on lead 12 by delay line 27. The delay line 27 is shown here to have a delay equal to one symbol of the QPSK data signal to allow differential demodulation of the received QPSK data signal. It is noted that coherent demodulation is possible with this invention by changing the delay line 27 to a carrier recovery circuit, such as a square law carrier recovery circuit. With aging and temperature changes occurring to the delay line 27, electrical length of the delay line 27 changes causing phase shifts in the recovered demodulation reference signal. These phase shifts must be corrected for the receiver 10 to operate optimally. The recovered demodulation reference signal from delay line 27 is carried by lead 28 to demodulation reference phase optimizer 30 which adjusts the recovered demodulation reference signal to produce the phase corrected demodulation reference signal on lead 15. Timing for sampling and quantizing the in-phase and quadrature demodulated baseband data (on leads 19a, 19b) is derived from the QPSK data signal on lead 12 by timing recovery circuitry 44 via the preamble filter 7 (FIG. 1). A clock signal having the same frequency as the symbol rate of the QPSK data signal (recovered clock) is carried by lead 45 from timing recovery circuitry 44 to timing phase optimizer 50. Timing phase optimizer 50 adjusts the phase of the recovered clock to produce the sampling clock on lead 24 for optimal sampling and quantization of the demodulated baseband data. The timing recovery circuitry 44 is detailed in FIG. 3. Referring temporarily to FIG. 3, the preamble, from preamble filter 7 (FIG. 1), enters the timing recovery circuitry 44 on lead 12 and is presented to a one-half symbol delay line 46 and to multiplier 47. Output of one-half symbol delay line 46 also is coupled to multiplier 47. The output of multiplier 47 is fed to bandpass filter 48 for removal of all signals other than a signal having the frequency of the QPSK data symbol rate. Output of bandpass filter 48 is squared up by slicer 49. Output from the slicer 49 is selectively coupled to injection locked oscillator 43 by switch 42 when the preamble of the bit stream is being sent. This causes oscillator 43 to acquire the frequency of the preamble and, hence, the QPSK data symbol rate. Output of oscillator 43 on lead 45 is the recovered clock. Because of aging and temperature changes affecting electrical characteristics of the delay line 46 and filter 48, correct phase of the recovered clock for optimum signaling is not guaranteed. Also, after switch 42 opens, oscillator 43 can drift in phase with respect to the correct phase due to aging and temperature changes. These phase errors in the sampling clock must be corrected for optimal operation of demodulator 10. It is noted that the output of slicer 49 can be used for the source of the recovered clock on lead 45 instead of oscillator 43 if the common input to delay line 46 and multiplier 47 is coupled to leads 19a or 19b (FIG. 2). Therefore, preamble filter 7 (FIG. 1), switch 42 and oscillator 43 can be eliminated. But, the foregoing problem still exists and the phase errors must be corrected.

Returning to FIG. 2, eye quality monitor 65, using the three magnitude bits from quantizers 22a, 22b on buses 26a, 26b produces a voltage on lead 67 proportional to how close the sampled and quantized in-phase and quadrature demodulated baseband data is to a predetermined amplitude or value representing the optimal amplitude for the demodulated baseband data. Details into operation of the eye quality monitor 65 will be discussed below in connection with FIG. 4, but it is sufficient to state here that the voltage on lead 67 (eye quality) is at a maximum when the in-phase and quadrature magnitude bits on buses 26a, 26b are equal to a predetermined value (the optimal amplitude) and any deviation from that value results in a voltage of lesser magnitude. Capacitor 69 blocks the DC component of the voltage appearing on lead 67 so that only variations in the voltage on lead 67 are passed to lead 70 (eye quality variation). Dither clock oscillator 72 generates a signal which is divided by four in divider 73 to produce two dither clock signals of identical frequency, but in quadrature. The frequency of the dither clock, shown here to be 5 Hertz, is much less than the symbol rate of the QPSK data signal. The dither clock signal on lead 74 is arbitrarily designated here as having 0° phase shift and is fed to demodulation reference phase optimizer 30. Similarly, the dither clock signal designated to have 90° phase shift on lead 75 is coupled to timing phase optimizer 50. Detailed description of the operation of both demodulation reference phase optimizer and timing phase optimizer 50 will be discussed below, but it is sufficient to state here that the demodulation reference phase optimizer 30 and timing phase optimizer 50 respond to the dither clock signals to vary the phase corrected demodulation reference signal (on leads 15 and 17) and the sampling clock (on lead 24), respectively, until the eye quality signal on line 67 is optimized. Thus, two loops are formed: a demodulation reference loop from the demodulation reference phase optimizer 30 through the multipliers 13a, 13b filters 20a, 20b, quantizers 22a, 22b, eye quality monitor 65 and back to the optimizer 30; and a clock loop from the timing phase optimizer 50 through the quantizers 22a, 22b, eye quality monitor 65 and back to the optimizer 50. Note that these two loops operate independently.

Figures 4, 4A, 4B, 5:
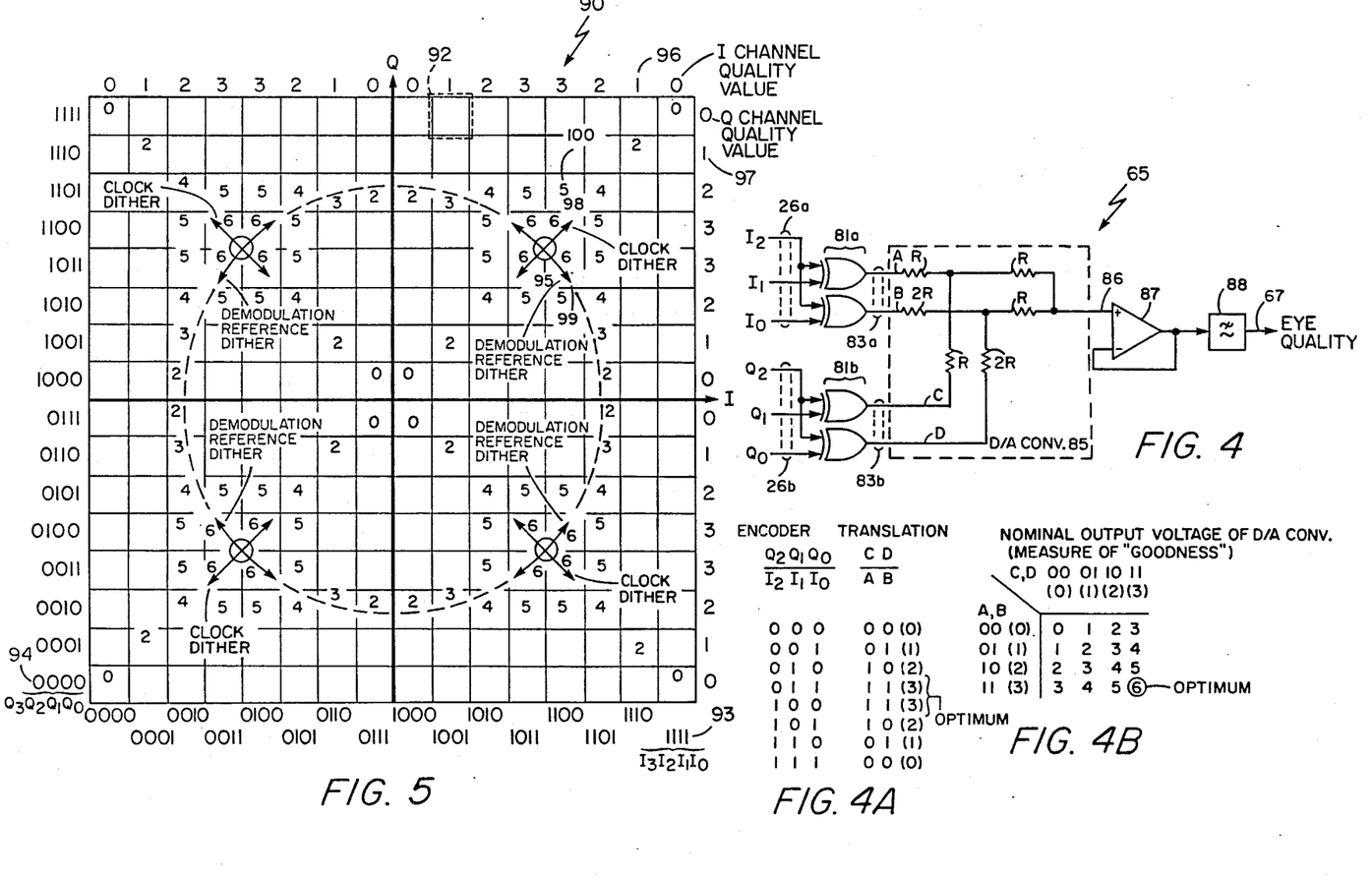
FIG. 4 is a schematic diagram of the eye quality monitor shown in FIG. 2.
FIG. 4A is an encoder translation table for showing the translation in the eye quality monitor of FIG. 4 from the digitized values of the received data signals to common signals.
FIG. 4B shows the output voltage of the D/A converter in the eye quality monitor of FIG. 4 for different combinations of values of the common signals.
FIG. 5 is a signal diagram showing the QPSK data signal states with the eye quality voltage associated with each quantizing area.

Referring to FIG. 4, the eye quality monitor 65 is diagrammed. The three magnitude bits from quantizer 22a (FIG. 2) are coupled to a first encoding means 81a via bus 26a. The three magnitude bits from four bit quantizer 22b (FIG. 2) are coupled to a second set of encoding means 81b via bus 26b. The first and second encoding means 81a, 81b are each shown here to be exclusive OR gates which encode the input from bus 26a or 26b to a pair of output bits or buses 83a, 83b, respectively, as shown in FIG. 4A. The encoding is chosen so that if the input is of a predetermined value (the optimum amplitude), here 011 or 100, the output is at its maximum, here 11. The further the input deviates from these optimum values, the smaller the output value. By not using the sign bit from the quantizers 22a, 22b (leads 25a, 25b, FIG. 2), the polarity of the signal being quantized is ignored. Since the states of a QPSK data signal are determined by each channel's polarity, only the magnitude of the QPSK data signal is used, making the eye quality monitor 65 insensitive to the different states of the QPSK data signal. It is noted that the encoding means 81a, 81b could be implemented by using a ROM. Referring back to FIG. 4, output of encoding means 81a, 81b is coupled to a digital-to-analog converter (D/A CONV) 85 for converting the output of the encoding means 81a, 81b into a voltage. The D/A converter 85 uses a resistor network to independently convert the digital levels on buses 83a and 83b to analog voltages and to combine the analog voltages into one output on lead 67, the eye quality signal (FIG. 2). FIG. 4B shows the output of the D/A converter 85 for the different logic states on buses 83a, 83b. It is noted that when the logic states of buses 83a, 83b are all at ones, signifying that the input on buses 26a, 26b to the eye quality monitor 65 is optimal in both the I and the Q channel, then the output voltage from D/A converter 85 is at a maximum, shown here as a voltage of 6 volts. The output of D/A converter 85 on lead 86 is buffered by voltage follower 87 and is in turn fed to low pass filter 88 and then to output lead 67.

To further understand operation of the eye quality monitor 65, FIG. 5 shows a signal diagram 90 of the demodulated baseband QPSK data signal and the effect of quantization by quantizers 22a, 22b (FIG. 2). Each one of a plurality of quantization regions 92 have corresponding I channel quantization values 93 and Q channel quantization values 94. These quantization values 93, 94 are the possible states of the outputs of the quantizers 22a, 22b (on buses 26a, 26b and leads 25a, 25b, FIG. 2). Channel quality values 96, 97, as encoded by encoding means 81a, 81b (FIG. 4), are shown opposite the corresponding I and Q quantization values 93, 94. This correspondence is shown in FIG. 4A. In each quantization region 92, an eye quality value 100 is shown, which corresponds to the output voltage on lead 67 of the eye quality monitor 65 (FIG. 2) and is the sum of the I and Q channel quality values 96, 97. This correspondence is shown in FIG. 4B. Using an exemplary one of the four possible states of a QPSK data signal 95, it is shown in an optimal position in the signal diagram 90. In this position, all quantization regions 92 surrounding it have an eye quality value 100 of 6 volts. Any deviation by the signal 92 from the optimal position causes the eye quality value 100 to decrease. Eye quality variation on lead 70 (FIG. 2) is the change in the eye quality value 100 as the signal 95 moves from one quantization region 92 to another region 92. Dither on signal 95, shown as clock dither 98 or demodulation reference dither 99, pulls signal 95 into different quantization regions in quadrature, i.e., the clock dither 98 is independent of the demodulation reference dither 99 so that the clock dither 98 pulls the signal into different quadrants than the demodulation reference dither 99 would. The amount of this dither is limited to an amount necessary to cause the signal 95 to vary between two quantization regions 92. This allows no variation in the eye quality signal on lead 67 (FIG. 4) when the signal 95 is in the optimum position (as shown here, the eye quality signal will have a value of 6 volts) but migration by the signal 95 from the optimum position will cause variations in the eye quality signal on lead 67 due to the dither. The demodulation reference phase optimizer 30 and the timing phase optimizer 50 try to maintain signal 95, on average, in the shown position such that the dither impressed on signal 95 causes variations into those quantization regions immediately adjacent to the optimum position. Therefore, the eye quality signal on lead 67 (FIG. 4) does not change. If the signal 95 were not positioned in the optimal position, the clock dither 98 and/or demodulation reference phase dither 99 would cause eye quality signal variations, thereby indicating to the demodulation reference phase optimizer 30 or the timing phase optimizer 50 that correction is needed to bring the signal 95 back to the shown optimum position.

Figure 6:
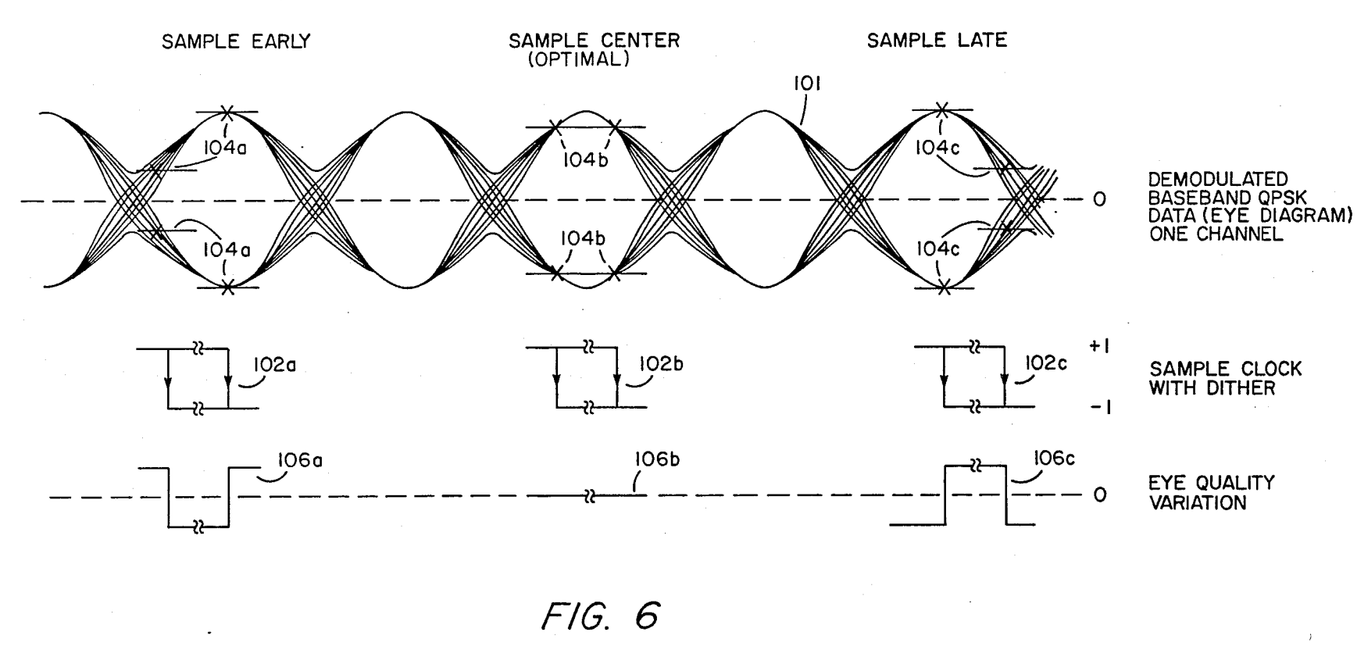
FIG. 6 demonstrates how dither on a sampling clock produces eye quality variations when sampling different portions of an eye diagram.

A further illustration of the operation of the eye quality measurement is shown in FIG. 6 for dither on the sampling clock. Operation with dither on the demodulation reference signal is similar. A demodulated baseband QPSK data signal 101 (an eye diagram) is shown as what is typically found as the input to quantizer 22a or 22b (FIG. 2). Representative sample clocks 102a–102c, having dither impressed thereon, are shown with the variations in the falling edge of the shown sample clocks 102a–102c, such that the falling edge will alternate from one position to the other. It is shown here that the falling edge of these sample clocks commands quantizers 22a, 22b (FIG. 2) to sample and quantize the demodulated baseband QPSK data signal 101. This dither produces variations in the sample taken. These variations are shown as eye quality variation signals 106a–106c. These eye quality variation signals are similar to what appears on lead 70 (FIG. 2). Note that the actual dither will not be as great as shown (approximately one-half symbol); this is done for illustrative purposes highlighting the variation in sample amplitude. Typically, the dither will be a very small portion of the QPSK data symbol. It is further noted that the dither on the sample clock 102a is much lower in frequency than that of the sample clock itself and, therefore, the QPSK data signal symbol rate. Therefore, many samples of the data signal 101 will be taken with the dither at one position and many samples will be taken with the dither at the other position. Also, the eye quality variation signal is determined from the magnitude and not the polarity of the sample points 104a–104c since the sign bit on leads 25a, 25b (FIG. 2) is not used by the eye quality monitor 65. It should also be noted that variations in the amplitude of the demodulated data signal 101 caused by the dither of the sampling clock will be of the type which allows correct operation of the timing phase optimizer 50 (FIG. 2) only with baseband demodulated data signals having a singular maxima, i.e., there must be a definite "eye" to the baseband data signal. Square wave baseband data would not work as there is no singular maxima to a square wave. This singular maxima typically is the optimum position to sample and quantize the baseband data signals. This is not a requirement for detecting the dither on the demodulation reference signal, however. Any variations in the phase of the demodulation reference signal will cause a change in the amplitude of the demodulated data signal 101 regardless of the shape of the data signal 101. In the first sampling case, SAMPLE EARLY, representing sampling by the sample clock 102a before the optimal sampling interval, the sample clock 102a samples demodulated QPSK data signal 101 at points 104a. By dithering the falling edge of the sample clock 102a, a different amplitude of the demodulated QPSK data signal 101 is sampled giving rise to the eye quality variation signal 106a. In the SAMPLE CENTER case, the dither on the sampling clock 102b causes the samples of the demodulated QPSK data signal 101 at points 104b to have substantially the same amplitude, causing eye quality variation signal 106b to be invariant. This is the optimum position for sampling by the sample clock. In the SAMPLE LATE case, dither on sample clock 102c causes the samples of the demodulated QPSK data signal 101 at sample points 104c to have eye quality variation 106c. Note that the eye quality variation 106c in the SAMPLE LATE case is opposite that of the eye quality variation 106a in the SAMPLE EARLY case. This difference in polarity allows the timing phase optimizer 50 (FIG. 2) to correct the sampling by the sample clock in the direction that best approximates the SAMPLE CENTER case.

Returning to FIG. 2, the demodulation reference phase optimizer 30 is diagrammed in detail. Multiplier 32 multiples the eye quality variation signal on lead 70 and the in-phase dither on lead 74 onto output lead 33 for coupling to integrator 34 which is in turn coupled to adder 37 via lead 35. Also, the in-phase dither signal on lead 74 is adjusted to a predetermined amplitude by attenuator 36 for presentation to adder 37. The output of adder 37 appears on lead 38 and is fed to the phase adjuster 39. The output of the integrator 34 is the demodulation reference phase error voltage, which indicates the amount of phase shift imparted to the recovered demodulation reference signal on lead 28 by phase adjuster 39 to get optimum demodulation of the QPSK data signal on lead 12. Similarly, the timing phase optimizer 50 has a multiplier 52 multiplying the eye quality variation on lead 70 and the quadrature dither on lead 75 onto output lead 53 for coupling to integrator 54. Output of integrator 54 is coupled to 8 bit quantizer 60 which digitizes the output of the integrator. Output from the 8 bit quantizer 60 is coupled to digitally programmable delay line 63 via the most significant 8 bits of bus 62. The amount of delay is selectable by a binary value placed on bus 62. The least significant bit (LSB) of bus 62 changes the phase shift through the delay line 63 the least amount. Switch 61 selects the amount of dither to be impressed upon the sampling clock on lead 24 by selecting the least significant bit (LSB) or the next to least significant bit (LSB+1) on bus 62 to carry the quadrature dither from lead 75. Therefore, the amount of dither impressed on the sampling clock is the minimum phase shift available from the delay line 63 (LSB is selected) or twice the minimum phase shift (LSB+1 selected). Operation of the timing phase optimizer 50 is similar to that of the demodulation reference phase optimizer 30, except the error voltage from integrator 54 is digitized and the delay line 63 does digitally what the phase adjuster 39 does in analog. No adder is needed as in the demodulation reference phase optimizer 30, since the dither is "added" in by using the least significant bits of the delay line 63 to introduce the dither signal.

Figure 7:
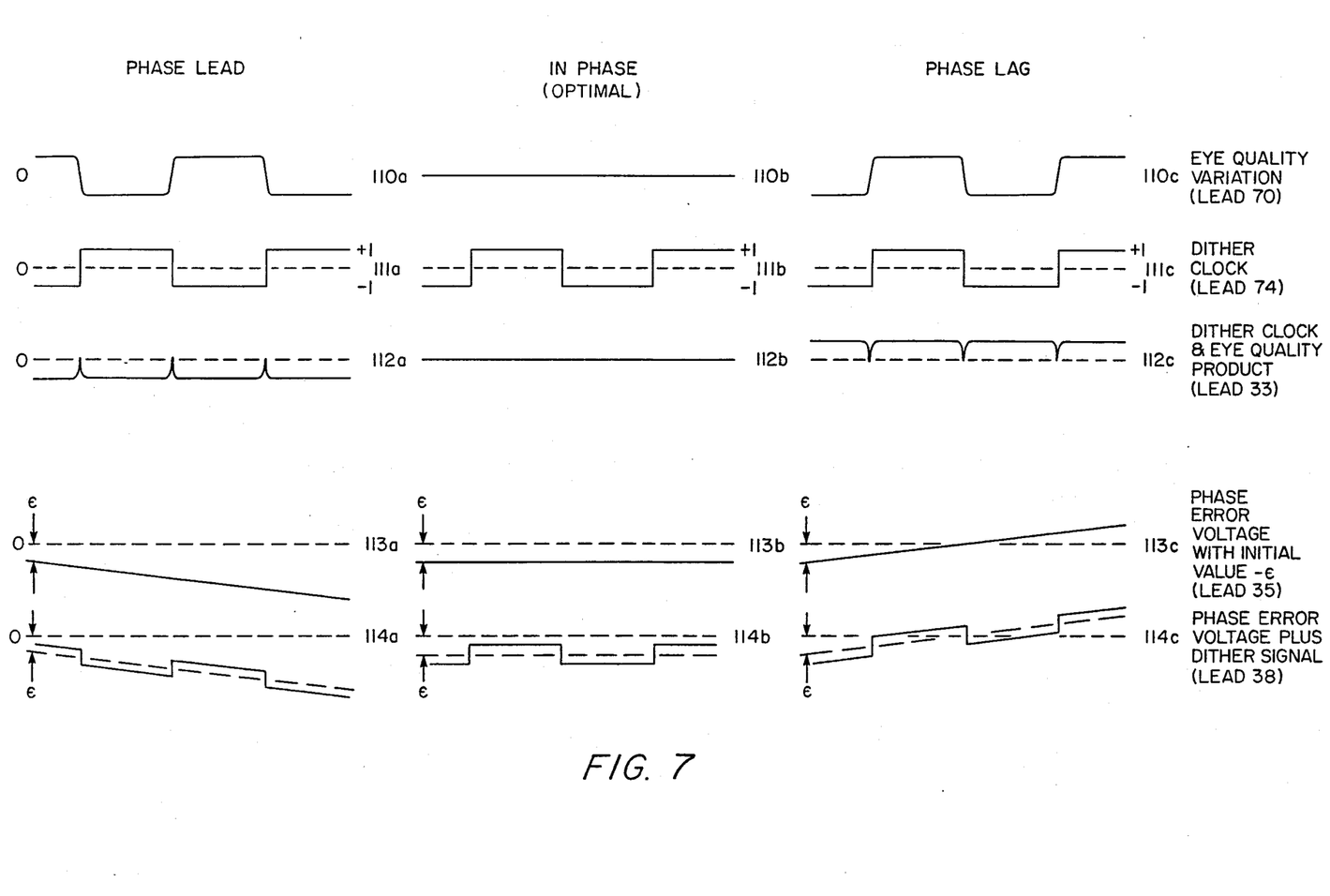
FIG. 7 illustrates the signals appearing in the demodulation reference phase optimizer of FIG. 2 during operation of that demodulation reference phase optimizer for different exemplary cases of operation.

Operation of the demodulation reference phase optimizer 30 is shown in FIG. 7. Operation of the timing phase optimizer 50 is similar except as noted above. Assuming, initially, the IN PHASE case, eye quality variation 110b is zero, corresponding to the signal on lead 70 (FIG. 2), and when multiplied by the in-phase dither 111b on lead 74, the output of multiplier 32 on lead 33 (FIG. 2) is zero, shown as signal 112b. Signal 113b shows the output of integrator 34 (on lead 35) having an initial value ε and, since the output of multiplier 32 in 112a is zero, the output of the integrator 34 does not change with time. Adder 37 combines the output of integrator 34 (113b) and an attenuated version of the dither signal 111b (on lead 40) to produce the output shown as signal 114b on lead 38 having a DC value of ε with the dither signal impressed thereon. This signal 114b is then coupled to the phase adjuster 39 by lead 38 to dither the demodulation reference signal back and forth and, on average, maintain the correct demodulation reference phase to produce no eye quality variation. For the PHASE LEAD case, dither signal 110a is shown and when multiplied by dither signal 111a in multiplier 32, signal 112a results having an average negative voltage. When signal 112a is fed to integrator 34 having an initial value ε, the output ramps in a negative direction as shown in signal 113a. Signal 114a shows the combination of the output of integrator 34 and the dither signal having a predetermined amplitude. Signal 114a is in turn presented to phase adjuster 39. In the PHASE LAG case, eye quality variation signal 110c is multiplied by dither signal 111c to produce signal 112c having an average positive voltage. It is noted that the average voltage in signal 112c is of opposite polarity of the average voltage in signal 112a, thereby indicating whether the demodulation reference signal is leading (PHASE LEAD) or lagging (PHASE LAG) the optimum phase (IN PHASE). Signal 112c, when fed to integrator 34 having an initial value of ε, causes the output of integrator 34 to ramp upward in voltage (signal 113c). Signal 113c is then combined with the dither having a predetermined amplitude to generate signal 114c for presentation to the phase adjuster 39. It is also noted that the PHASE LEAD and the PHASE LAG cases are not steady state. As the output of the integrator 34 changes (signals 113a and 113c), the phase of the recovered demodulation reference signal on lead 15 reaches the point that the eye quality variation on lead 70 (signals 110a, 110c) goes to zero (signal 110b). At this point, there are no corrections to the loop being done and the demodulation reference phase optimizer 30 is in steady state, the IN PHASE case.

Figure 8:
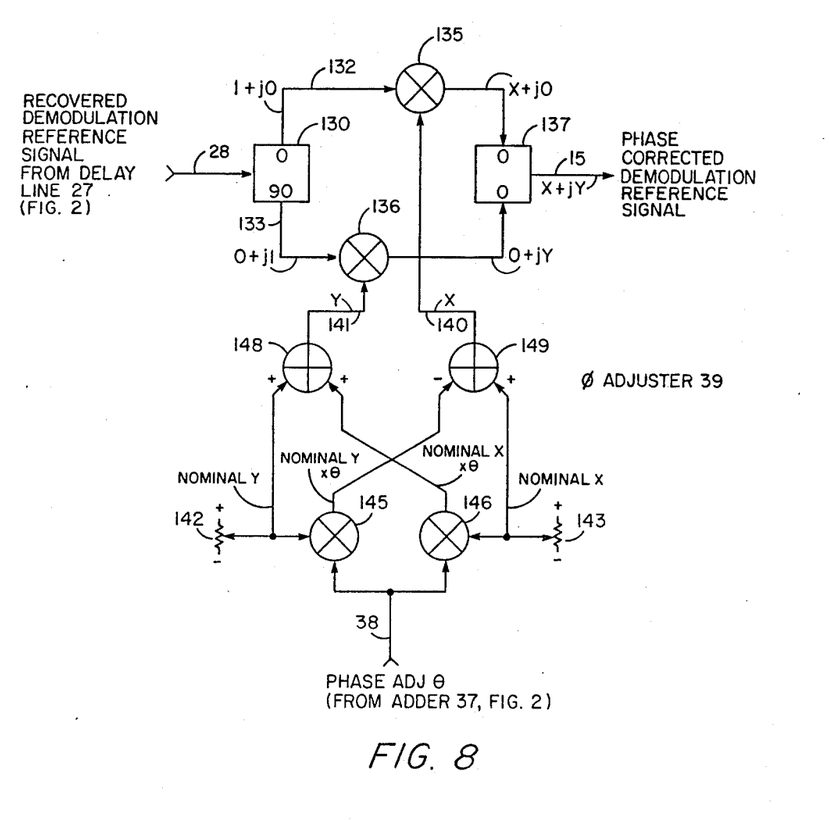
FIG. 8 diagrams the phase adjuster in the demodulation reference phase optimizer of FIG. 2.

Referring to FIG. 8, the phase adjuster 39 is diagrammed. This phase shifter is implemented by summing two orthogonal vectors X+j0 and 0+jY. These vectors are generated by the recovered demodulation reference signal on lead 28 being fed to a 90° hybrid 130 which splits the signal into an in-phase signal (1+j0) on lead 132 and a quadrature signal (0+j1) on lead 133. The signal on lead 132 (1+j0) is fed to multiplier 135 whose output is the X+j0 vector. The quadrature output (0+j1) from 90° hybrid 130 on lead 133 is coupled to multiplier 136 whose output is the 0+jY vector. The X+j0 and the 0+jY vectors are combined by the 0° power combiner 137 producing the phase corrected demodulation reference signal (X+jY) on lead 15. The magnitude and polarity of the X+j0 and 0+jY vectors are determined by the signals on leads 140 and 141 labeled X and Y. The X and Y values modify the X+j0 and the 0+jY vectors to achieve the desired phase shift. This is shown by the relationship as follows:

$$X = \text{NOMINAL } X \times \cosine \theta - \text{NOMINAL } Y \times \sine \theta$$

$$Y = \text{NOMINAL } Y \times \cosine \theta + \text{NOMINAL } X \times \sine \theta$$

The NOMINAL X and NOMINAL Y values are set by potentiometers 143 and 142, respectively. The phase adjust value, or $\theta$, is the phase adjust input on lead 38. For small $\theta$, cosine $\theta$ is approximately equal to one and sine $\theta$ is approximately equal to $\theta$. Therefore, the above equations are simplified into the form:

$$X = \text{NOMINAL } X - \text{NOMINAL } Y \times \theta$$

$$Y = \text{NOMINAL } Y + \text{NOMINAL } X \times \theta$$

To implement this equation, the phase adjust signal on lead 38 is coupled to multipliers 145 and 146. Multiplier 145 forms the product between the phase adjust value $\theta$ and the NOMINAL Y value and multiplier 146 forms the product of the phase adjust value $\theta$ and the NOMINAL X value. Adder 148 adds the NOMINAL Y value and the product of $\theta$ and NOMINAL X to produce the Y value and subtracter 149 takes the NOMINAL X value and subtracts the product of NOMINAL Y and phase adjust value $\theta$ to produce the X value.

What is claimed is:

1. In a communication system wherein time-multiplexed phase shift keyed (PSK) signals at a radio frequency from a single transmitting station are received at each one of a plurality of spatially separated receiving stations, such transmitted signals having a preamble portion followed by a data bearing portion, each one of the plurality of spatially separated receiving stations having a receiver, each one of such receivers having an improved demodulator adapted to demodulate the preamble and data portion of the received PSK signals and synchronize to the preamble portion of the received PSK signals, each one of such improved demodulators comprising:

demodulation means for downconverting the received PSK signals to baseband PSK signals, fed by the received PSK signals and by a phase adjustable signal having substantially the same frequency as the received PSK signals;

sampling means for sampling the baseband PSK signals at adjustable intervals, and providing sampled PSK signals;

indicator means, responsive to the sampled baseband PSK signals, for generating a correlation signal proportional to the degree of correlation between the amplitude of the baseband PSK signals and a predetermined optimal amplitude;

means for generating first and second either clock pulses in quadrature, the first dither clock pulses for application to the demodulation means to vary the phase of the phase adjustable signal a predetermined amount to produce amplitude variations in the baseband PSK signals and the second dither clock pulses for application to the sampling means to vary the sampling interval a predetermined amount to produce amplitude variations in the sampled PSK signals;

first correction means, responsive to the correlation signal and the first dither clock pulses, for generating a first error signal for application to the modulation means to phase adjust the phase of the phase adjustable signal until variations in the correlation signal in response to the first dither clock pulses are minimized; and second correction means, responsive to the correlation signal and the second dither clock pulses, for generating a second error signal for application to the sampling means to vary the sampling interval until variations in the correlation signal in response to the second dither clock pulses are minimized.

2. In a communication system wherein time multiplexed phase shift keyed (PSK) signal at a radio frequency from a single transmitting station are received at each one of a plurality of spatially separated receiving stations, such transmitted signals having a preamble portion followed by a data bearing portion, each one of the plurality of spatially separated receiving stations having a receiver, each one of such receivers having an improved demodulator adapted to synchronize to the preamble portion and then demodulate the data portion of the received PSK signals, each one of such improved demodulators comprising:

means for generating a demodulation reference signal having substantially the same radio frequency as the received PSK signals;

first shifting means, responsive to the demodulation reference signal and a first control signal, for shifting the phase of the demodulation reference signal in response to the first control signal;

means, responsive to the received PSK signals and the phase shifted demodulation reference signal, for downconverting the received PSK signals to baseband PSK signals;

means for generating sample clock pulses having substantially the same frequency as the symbol rate of the received PSK signals;

second shifting means, resposive to the sample clock pulses and a second control signal, for shifting the phase of the sample clock pulses in response to the second control signal;

first sampling means, responsive to the baseband PSK signals and the phase shifted sample clock pulses, for sampling the baseband PSK signals in response to the phase shifted sample clock pulses;

indicator means, responsive to the sampled baseband PSK signals, for generating a correlation signal proportional to the degree of correlation between the amplitude of the baseband PSK signals and a predetermined optimal amplitude;

means for generating first and second dither clock pulses, the second dither clock pulses being 90° out of phase from the first dither clock pulses;

first correction means, responsive to the first one of the dither clock pulses and the correlation signal, for generating the first control signal and varying the phase of the demodulation reference signal to produce variations in the correlation signal in response to the first one of the dither clock pulses and to minimize those variations in response to a first error signal; and second correction means, responsive to the first one of the dither clock pulses and the correlation signal, for generating the second control signal and varying the phase of the sample clock pulses to produce variations in the correlation signal in response to the second one of the dither clock pulses and to minimize those variations in response to a second error signal.

3. The improved demodulator as recited in claim 2, the first and second correction means each further comprising:

filter means for passing variations in the correlation signal;

multiplier means, responsive to the variations in the correlation signal and the corresponding dither clock pulses for generating the product thereof to its output;

integrator means, coupled to the output of the multiplier, for generating the corresponding error signal;

attenuation means, responsive to the corresponding dither clock pulses, for adjusting the amplitude of the corresponding dither clock pulses to a predetermined amplitude; and summing means, responsive to the dither clock pulses from the attenuation means and the corresponding error signal, for producing a sum signal indicative of the corresponding control signal.

4. The improved demodulator as recited in claim 3, further comprising:

third phase shifting means for phase shifting by 90° the phase adjusted demodulation reference signal from the first shifting means;

means, responsive to the third phase shifting means and the received PSK signals, for downconverting the signals in quadrature with the received PSK signals to the baseband signals; and second sampling means, responsive to the phase shifted sample clock pulses, for sampling the baseband signals;

wherein the indicator means is additionally responsive to the sampled baseband signals.

5. In a communication system wherein time multiplexed quadrature phase shift keyed (QPSK) signals at a radio frequency from a single transmitting station are received at each one of a plurality of spatially separated receiving stations, each one of the plurality of spatially separated receiving stations having a receiver, each one of such receivers having a demodulator adapted to demodulate and sample the transmitted QPSK signals in an in-phase channel and a quadrature channel, the signals in each channel representing binary data, each one of such demodulators having a received signal quality monitor for indicating how the amplitude of the demodulated and sampled QPSK signals compares to a predetermined value representing the optimal amplitude for the demodulated and sampled QPSK signals, each one of such received signal quality monitors comprising:

first encoding means for transmitting the signals in the in-phase channel of the demodulated and sampled QPSK signals to a first common signal;

second encoding means for translating the signals in the quadrature channel into a second common signal;

means for converting the first common signal and the second common signal to corresponding voltages; and means for combining such voltages to form a common output voltage representative of a degree of correlation between the demodulated and sampled QPSK signals and the predetermined value.

6. A received signal quality monitor as recited in claim 5, the means for converting comprising:

first digital-to-analog converter means for converting the first common signal to a first voltage;

second digital-to-analog converter means for converting the second common signal to a second voltage; and summer means, responsive to the first and second voltages, to form the common output voltage.

7. A phase shifter for shifting the phase of an input signal, by an amount determined by a phase adjust signal, in passing from an input port to an output port comprising:

phase splitting means, responsive to the input signal at the input port, for transforming the input signal into two signals in quadrature;

first means, responsive to a first intermediate control signal and a first one of the two signals in quadrature, for taking the product thereof;

second means, responsive to a second intermediate control signal and a second one of the two signals in quadrature, for taking the product thereof;

means for summing the products from the first means and the second means to an output port;

means for subtracting a third intermediate control signal from a first predetermined value to produce the first intermediate control signal;

means for adding a fourth intermediate control signal to a second predetermined value to produce the second intermediate control signal;

first multiplying means, responsive to the phase adjust signal and the first predetermined value, for taking the product thereof to produce the fourth intermediate control signal; and second multiplying means, responsive to the phase adjust signal and the second predetermined value, for taking the product thereof to produce the third intermediate signal;

wherein the first and second predetermined values determine a nominal phase shift that the phase shifter imparts to the input signal as it passes to the output port.

8. Apparatus as in claim 1 wherein said demodulation means comprises:

multiplying means, fed by the received PSK signals and by the phase adjustable signal, for providing the baseband PSK signals.

9. A method for monitoring eye quality in a recieved phase shift keyed signal, comprising:

forming in-phase and quadrature signals from the received signal;

encoding the in-phase signal to an in-phase correlation voltage representing the degree of correlation between the magnitude of in-phase signal and an optimum in-phase signal; and encoding the quadrature signal to a quadrature correlation voltage representing the degree of correlation between the magnitude of the quadrature signal and an optimum correlation signal.

10. A method as in claim 9 additionally comprising:

combining the in-phase correlation voltage and the quadrature correlation voltage to obtain an indication of the received signal eye quality.

11. A method for demodulating received phase shift keyed signals comprising:

multiplying the received signals by an adjustable signal to obtain downconverted signals;

sampling the downconverted signals using a sampling clock, to obtain sampled signals;

providing a correlation signal indicative of the degree of correlation between the sampled signals and predetermined optimum signals;

dithering the adjustable signal in accordance with a first dither clock;

dithering the sampling clock in accordance with a second dither clock;

phase adjusting the adjustable signal in response to the first dither clock and the correlation signal;

phase adjusting the sampling clock in response to the second dither clock and the correlation signal.

* * * * *